(12) United States Patent
Suter et al.

(10) Patent No.: US 7,878,113 B2
(45) Date of Patent: Feb. 1, 2011

(54) JUICE EXTRACTOR INCLUDING DRIVE SHAFT SEAL AND RELATED METHODS

(75) Inventors: Michael L. Suter, Lakeland, FL (US); Scott Jackson, Brandon, FL (US)

(73) Assignee: John Bean Technologies Corporation, Chicago, IL (US)

( * ) Notice: Subject to any disclaimer, the term of this patent is extended or adjusted under 35 U.S.C. 154(b) by 580 days.

(21) Appl. No.: 11/531,985

(22) Filed: Sep. 14, 2006

(65) Prior Publication Data

US 2008/0092755 A1    Apr. 24, 2008

(51) Int. Cl.
*A23B 5/00* (2006.01)
*A23N 1/00* (2006.01)
*A47J 43/14* (2006.01)

(52) U.S. Cl. ........................................ 99/495; 277/510
(58) Field of Classification Search .................. 99/495; 277/510, 579–581
See application file for complete search history.

(56) References Cited

U.S. PATENT DOCUMENTS

| | | | | |
|---|---|---|---|---|
| 3,735,991 A | * | 5/1973 | Nobs | 277/510 |
| 4,878,766 A | * | 11/1989 | Boyd | 384/130 |
| 5,433,453 A | * | 7/1995 | Dalton | 277/606 |
| 5,970,861 A | | 10/1999 | Suter et al. | 100/37 |
| 5,992,311 A | * | 11/1999 | Suter et al. | 100/37 |
| 5,996,485 A | | 12/1999 | Suter et al. | 100/37 |
| 6,126,321 A | | 10/2000 | Fetty et al. | 384/459 |
| 6,334,713 B1 | | 1/2002 | Chu | 384/464 |
| 6,568,319 B2 | | 5/2003 | Schrader et al. | 100/108 |
| 7,017,916 B2 | | 3/2006 | Sayers | 277/543 |
| 2006/0037498 A1 | | 2/2006 | Suter et al. | 100/213 |

* cited by examiner

*Primary Examiner*—M. Alexandra Elve
(74) *Attorney, Agent, or Firm*—Allen, Dyer, Doppelt, Milbrath & Gilchrist, P.A.

(57) ABSTRACT

A juice extractor may include a drive housing and a drive shaft extending outwardly therefrom to a juice extraction area. The juice extractor may further include a shaft seal that, in turn, includes a seal housing and at least one positioning ring contained within the seal housing and surrounding a corresponding drive shaft. The seal may also include at least one sealing ring contained within the seal housing adjacent the at least one positioning ring and surrounding the corresponding drive shaft. The at least one positioning ring may be radially spaced from the corresponding drive shaft when the corresponding drive shaft is aligned along the seal axis, and the at least one sealing ring may sealingly engage the corresponding drive shaft and be radially spaced from adjacent portions of the seal housing when the corresponding drive shaft is aligned along the seal axis.

25 Claims, 4 Drawing Sheets

JUICE EXTRACTOR INCLUDING DRIVE SHAFT SEAL AND RELATED METHODS

FIELD OF THE INVENTION

The present invention relates to the field of juice extractors, and, more particularly, to a juice extractor and its associated shaft seals and related methods.

BACKGROUND OF THE INVENTION

Citrus juice extraction on a commercial scale can be advantageously performed with a juice extractor including upper and lower cups that move relative to one another along a reciprocal path of travel. The sides of both the upper and lower cups typically comprise fingers that support a fruit so that it can be squeezed without bursting. The fingers of the upper cup interdigitate or intermesh with those of the lower cup.

An orange or other fruit can be fed, for example, to the bottom cup by a cam-operated feeding device. The upper and lower cups are then brought together so that the respective fingers of the cup intermesh and the fruit therebetween is accordingly squeezed. Sharp, typically circular, cutters are positioned in the top and bottom cups. As the cups move relative to one another, the fruit is pressed against the cutters. The cutters cut plugs from both the top and bottom portions of the fruit as the interdigitating fingers of the two cups mesh together.

The cutting of the plug from the top portion of the fruit promotes separation of the peel from the internal portions of the fruit (i.e., juice and pulp). The plug cut from the lower portion of the fruit allows the internal portions of the fruit to be forced down into a strainer tube positioned just below the lower cup cutter. The strainer tube, in turn, is positioned within a manifold.

Such whole fruit juice extraction is disclosed in commonly assigned U.S. Pat. Nos. 5,970,861; 5,992,311; 5,996,485; and 6,568,319 the entire disclosures of which are incorporated herein by reference. Additional enhancements in this type of fruit juice extraction technology are disclosed in commonly assigned U.S. Pat. Publication No. 2006/0037498, for example, the disclosure of which is also hereby incorporated by reference in its entirety. Such a juice extractor includes an upper drive housing and a juice extraction area below the drive housing. A series of drive rods extend through the bottom of the drive housing and to the extraction area. These drive rods typically pass through shaft seals carried by the drive housing. The drive shafts are moved reciprocally in an up and down fashion, but are also subject to transverse motion.

The components within the drive housing have been lubricated in the past with an oil bath. Accordingly, the shaft seals have also been lubricated with the oil bath. Newer generations of extractors, such as those disclosed in U.S. Pat. Publication No. 2006/0037498, for example, may now include grease as a lubricant for the components within the drive housing, and, thus, conventional shaft seals requiring oil lubricant may no longer be adequate. In addition, the juice extraction process may generate peel, frit, peel oil, and other debris in the juice extraction area that is desirably kept out of the drive housing.

SUMMARY OF THE INVENTION

In view of the foregoing background, it is therefore an object of the present invention to provide a juice extractor including a drive shaft seal able to accommodate transverse as well as reciprocal motion of the drive shaft, operable without oil lubrication, and/or able to effectively seal to the drive shaft.

This and other objects, features, and advantages are provided by a juice extractor including a juice extraction area, a drive housing, and at least one drive shaft extending to the juice extraction area from the drive housing. The drive shaft may be reciprocated and subject to transverse motion. Additionally, the juice extractor may include at least one shaft seal carried by the drive housing. The shaft seal may include a seal housing having a seal axis, and at least one positioning ring contained within the seal housing and surrounding a corresponding drive shaft. Moreover, the shaft seal may include at least one sealing ring contained within the seal housing adjacent the at least one positioning ring and surrounding the corresponding drive shaft. The at least one positioning ring may be radially spaced from the corresponding drive shaft when the corresponding drive shaft is aligned along the seal axis. The at least one sealing ring may sealingly engage the corresponding drive shaft and be radially spaced from adjacent portions of the seal housing when the corresponding drive shaft is aligned along the seal axis to thereby accommodate transverse motion of the corresponding drive shaft.

In some embodiments, a pair of longitudinally spaced apart positioning rings may slidably and sealingly engage opposite sides of the at least one sealing ring. In addition, each positioning ring may engage radially adjacent portions of the seal housing. Each positioning ring may comprise stainless steel, for example.

The seal housing may have an opening in a first end thereof defining a perimeter being radially spaced from the corresponding drive shaft when aligned along the seal axis. Additionally, the seal housing may have a retaining ring groove adjacent a second end thereof opposite the first end, and the shaft seal may further include a retaining ring removably positioned in the retaining ring groove. In some embodiments, a positioning ring may be removably positioned in this groove so that the positioning ring serves as a retaining ring.

The shaft seal may be devoid of lubricants. In other words, the shaft seal may be self-lubricating. For example, the at least one sealing ring may comprise a resin and TFE fluorocarbon fibers therein.

In some embodiments, the shaft seal may further include at least one fastener securing the seal housing to adjacent portions of the drive housing. In other words, in these embodiments, the seal housing is a separate component from adjacent portions of the drive housing. In other embodiments, the seal housing may be integrally formed with adjacent portions of the drive housing.

A method aspect is for making a shaft seal for a drive shaft of a juice extractor. The method may include providing a seal housing having a seal axis, and disposing at least one positioning ring within the seal housing to surround the drive shaft and be radially spaced therefrom when the drive shaft is aligned along the seal axis. Additionally, the method may include disposing at least one sealing ring within the seal housing adjacent the at least one positioning ring to sealingly engage the drive shaft and be radially spaced from adjacent portions of the seal housing when the drive shaft is aligned along the seal axis.

Disposing the at least one positioning ring may include disposing a pair of longitudinally spaced apart positioning rings slidably and sealingly engaging opposite sides of the at least one sealing ring. More particularly, disposing the at least one positioning ring may include disposing the at least one positioning ring to engage radially adjacent portions of the seal housing.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notations are used to indicate similar elements in alternate embodiments.

Figure 1:
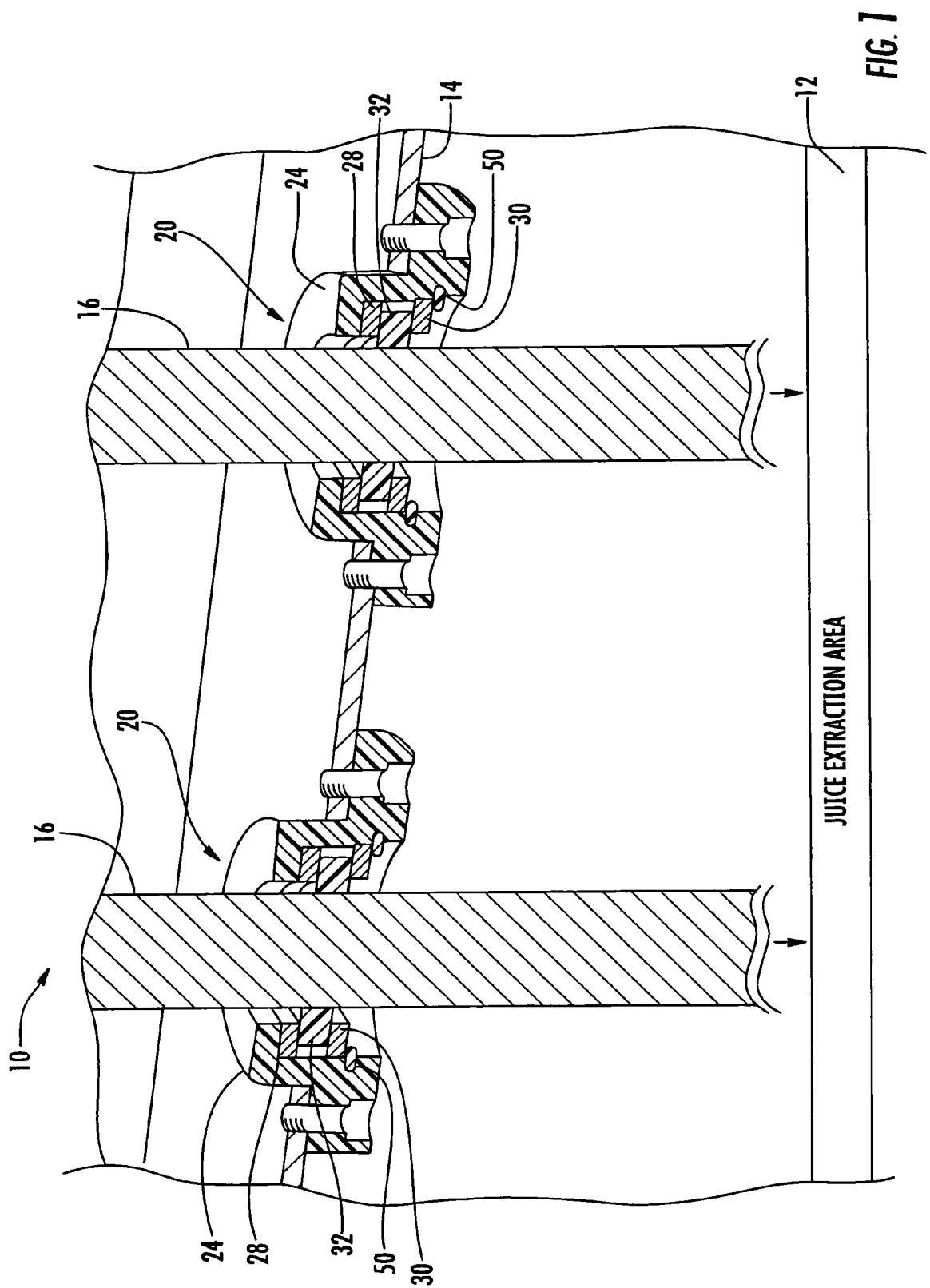
FIG. 1 is a partial cross-sectional view of a juice extractor with shaft seals according to the present invention.
Figure 2:
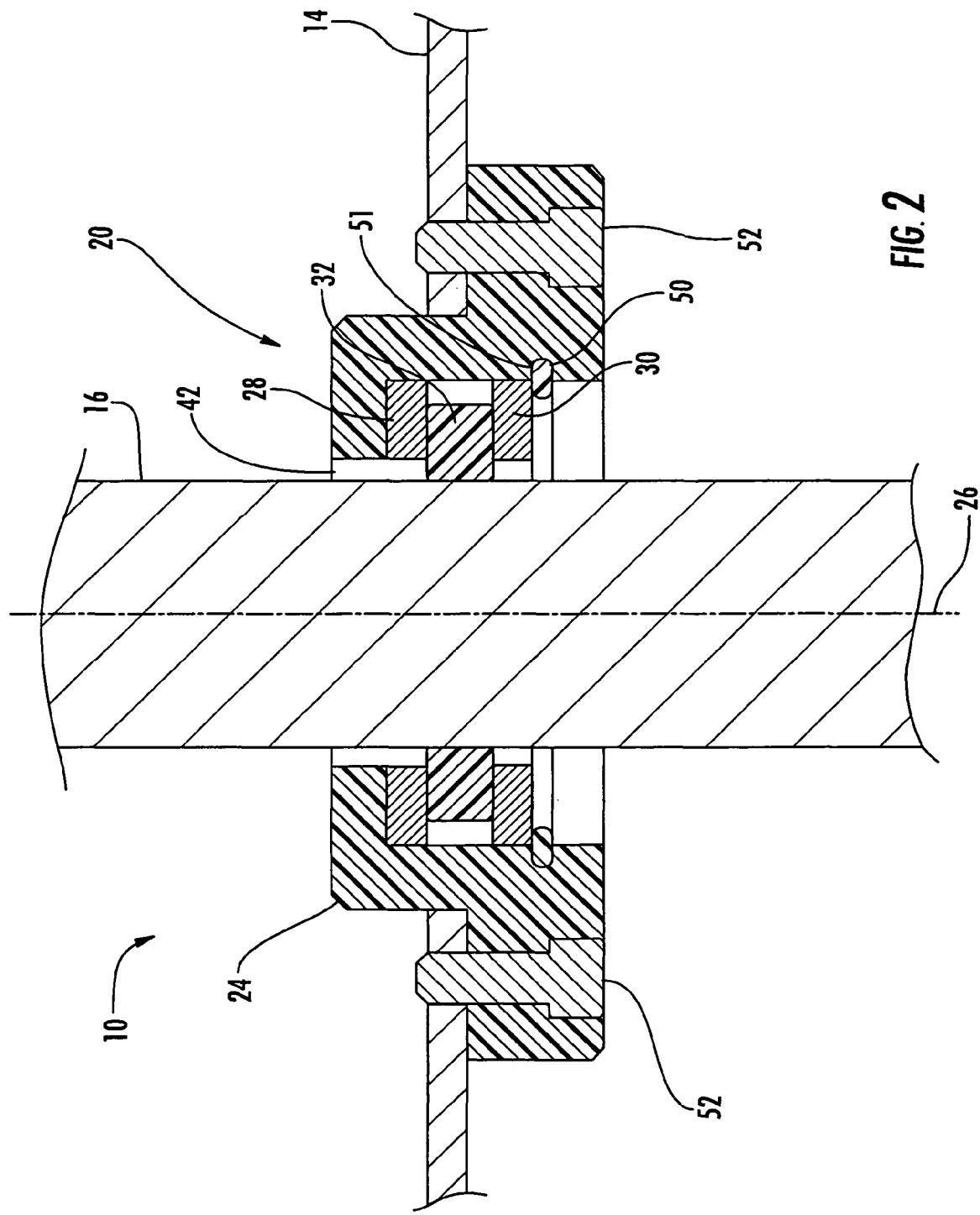
FIG. 2 is an enlarged cross-sectional view of a shaft seal of FIG. 1.

Referring initially to FIGS. 1-2, a juice extractor 10 illustratively includes a juice extraction area 12, a drive housing 14 and drive shafts 16 extending outwardly from the drive housing to the juice extraction area. The juice extraction area 12 may include reciprocating cups, cutters, strainer tubes, etc. as described in the above mentioned patents and patent applications assigned to the assignee of the present invention. As such, the juice extraction area 12 requires no further discussion herein. Of course, other types of juice extraction areas 12 are also contemplated.

Each drive shaft 16 may be reciprocated and subject to transverse motion during the juice extraction process. Each drive shaft 16 may be driven by drive components of the type as also described in the above mentioned patents and patent applications assigned to the assignee of the present invention, and these drive components require no further discussion herein. In addition, other types of drive components may also be used to reciprocate the drive shafts 16 as will be appreciated by those of skill in the art.

The juice extractor 10 further includes a shaft seat 20 carried by the drive housing 14 for each drive shaft 16. For clarity of explanation, only two drive shafts 16 and associated shaft seals 20 are shown in FIG. 1, although those of skill in the art will appreciate that only a single drive shaft 16 and shaft seal 20 could be used in some embodiments, and more than two would be used in typical commercial juice extractors.

The drive shaft seal 20 is advantageously able to accommodate transverse as well as reciprocal motion of the drive shaft, may be operable without oil lubrication, and/or may be able to effectively seal to the drive shaft to reduce the entry of debris into the drive housing 14. As will be appreciated by those skilled in the art, the transverse motion or movement may be relatively small, as may be caused by shaft deflection, etc.

The shaft seal 20 illustratively includes a seal housing 24 having a seal axis 26, and includes a pair of positioning rings 28, 30 contained within the seal housing and surrounding the drive shaft 16. The seal housing 24 may comprise a plastic material as shown in the illustrated embodiment, and in other embodiments, the shaft housing may comprise metal, such as stainless steel, for example.

The shaft seal 20 illustratively includes a sealing ring 32 contained within the seal housing 24 between the pair of positioning rings 28, 30 and surrounding the drive shaft 16. The pair of positioning rings 28, 30 are radially spaced from the drive shaft 16 when the drive shaft is aligned along the seal axis 26 (FIG. 2). The sealing ring 32 sealingly engages the drive shaft 16 and is radially spaced from an adjacent portion of the seal housing 24 when the drive shaft is aligned along the seal axis 26 to thereby accommodate transverse motion of the drive shaft.

Although the illustrated seal embodiment includes a pair of positioning rings 28, 30 and a sealing ring 32 within a seal housing 24, one or more than two positioning rings and more than one sealing ring may be included within the seal housing in other embodiments. The sealing ring 32 may comprise a resin and TFE fluorocarbon fibers therein, as appreciated by one of skill in the art, such as Delrin AF®, for example. The sealing ring 32 may thus not need lubrication in the form of oil or grease, rather its surface properties may provide the needed wear resistance and low coefficient of friction as will be appreciated by those skilled in the art. The positioning rings 28, 30 may comprise stainless steel, for example, although other materials may also be used.

The pair of longitudinally spaced apart positioning rings 28, 30 may slidably and sealingly engage opposite sides of the sealing ring 32. The slidable and sealing engagement of the positioning rings 28, 30 and the sealing ring 32 accommodates the transverse motion of the drive shaft 16 and reduces debris from entering the drive housing 14. Each positioning ring 28, 30 may engage radially adjacent portions of the seal housing 24 as shown in the illustrated embodiment, or a relatively small gap may be left therebetween.

The seal housing 24 illustratively has an opening 42 in a first or upper end thereof, the perimeter of the opening being radially spaced from the drive shaft 16 when the drive shaft is aligned along the seal axis 26. The radial spacing of the perimeter of the seal housing opening 42 from the drive shaft 16 may further accommodate transverse motion of the drive shaft.

At its lower end, the seal housing 24 has a retaining ring groove 51. The shaft seal 20 further includes a retaining ring 50 removably positioned in the retaining ring groove 51. The retaining ring 50 positioned within the retaining ring groove 51 provides support to maintain the slidable and sealing engagement between the positioning rings 28, 30 and sealing ring 32 within the seal housing 24. The retaining ring 50 may be a removable snap ring, for example, thereby facilitating removal of the positioning rings 28, 30 and/or the sealing ring 32, such as during maintenance.

In the illustrated embodiment, the shaft seal 20 further includes a plurality of fasteners 52 (FIG. 2) securing the seal housing 24 to adjacent threaded portions of the drive housing 14. Such fasteners 52 may be threaded bolts, for example, or any other type of temporary or permanent fastener as will be appreciated by those skilled in the art.

Figure 3:
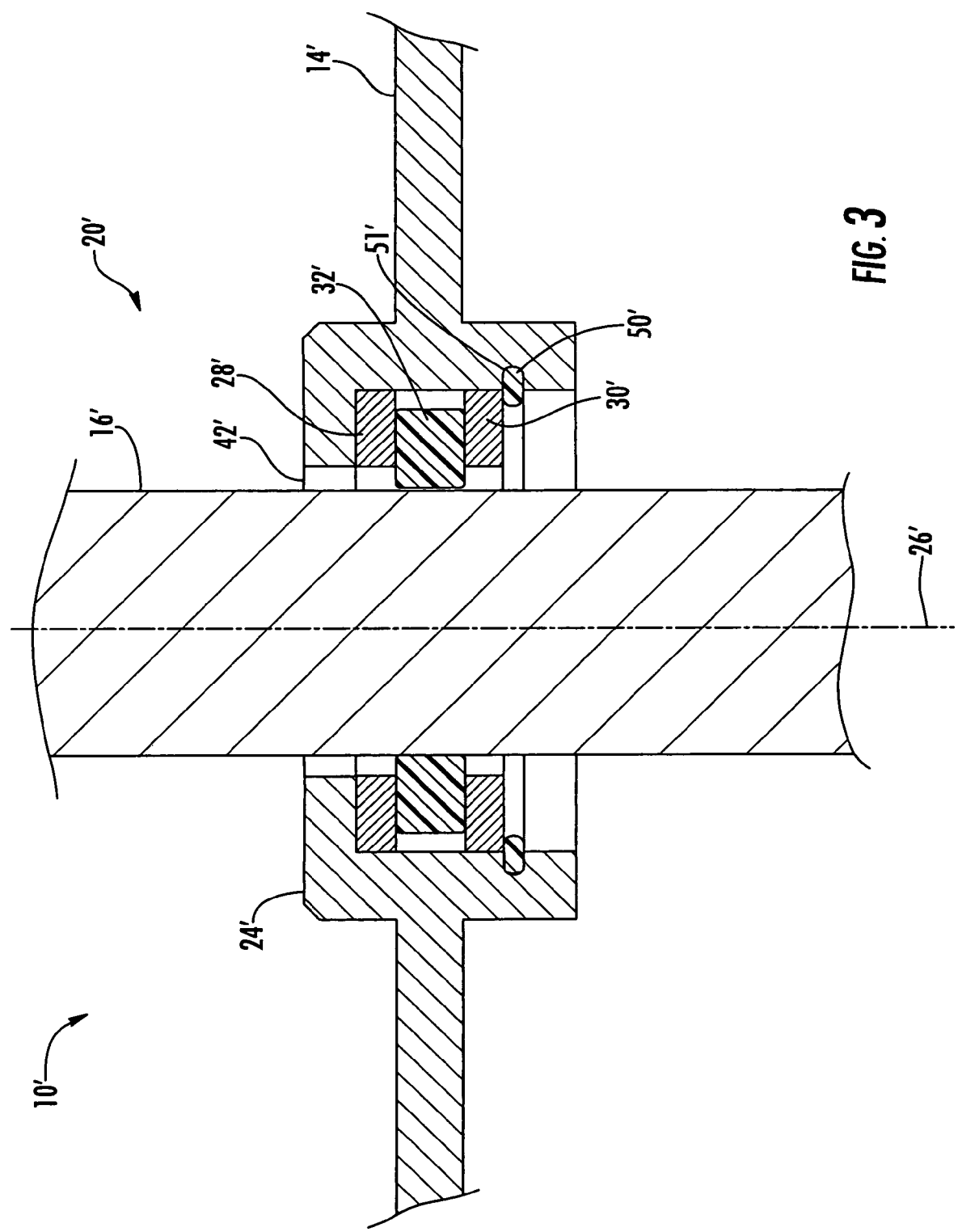
FIG. 3 is an enlarged cross-sectional view of a shaft seal according to an alternative embodiment of the present invention.

Referring now to FIG. 3, another embodiment illustratively includes a shaft seal 20' having a seal housing 24' integrally formed with adjacent portions of the drive housing 14'. Those other elements, not specifically mentioned, are indicated with prime notation, are similar to those elements described above, and need no further discussion herein.

Figure 4:
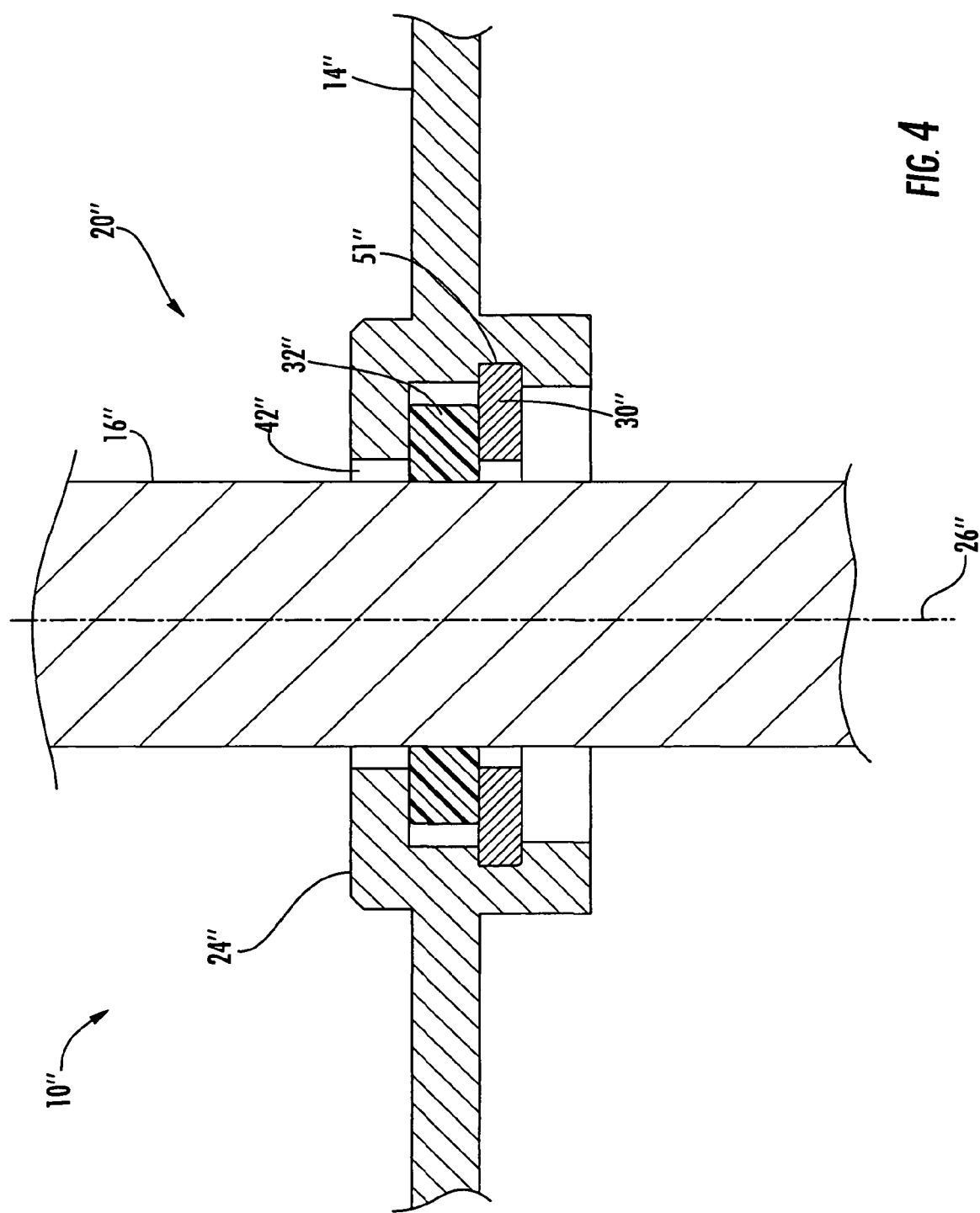
FIG. 4 is enlarged cross-sectional view of a shaft seal according to yet another embodiment of the present invention.

Turning now additionally to FIG. 4, yet another embodiment of the shaft seal 20" is now described. In this embodiment, only a lower positioning ring 30" is provided. Moreover, in this embodiment this lower positioning ring 30" is received within the retaining ring groove 51" to also serve as a retaining ring to hold the sealing ring 32" within the integral housing 24". Of course, in other embodiments, the single lower positioning ring 30" could be used with the separate housing 24 as shown in FIG. 2, for example. Those other elements, not specifically mentioned, are indicated with double prime notation, are similar to those elements described above, and need no further discussion herein.

Returning again to FIGS. 1-2, a method aspect is for making a shaft seal 20 for a drive shaft 16 of a juice extractor 10. The method includes providing a seal housing 24 having a seal axis 26, and disposing a pair of positioning rings 28, 30 within the seal housing to surround the drive shaft 16 and be radially spaced therefrom when the drive shaft is aligned along the seal axis. Additionally, the method may include disposing a sealing ring 32 within the seal housing 24 adjacent the positioning rings 28, 30 to sealingly engage the drive shaft 16 and be radially spaced from an adjacent portion 34 of the seal housing when the drive shaft is aligned along the seal axis 26.

Disposing the positioning rings 28, 30 may include disposing a pair of longitudinally spaced apart positioning rings 28, 30 slidably and sealingly engaging opposite sides of the at least one sealing ring 32. More particularly, disposing the positioning rings 28, 30 may include disposing the positioning rings 28, 30 to engage radially adjacent portions 38, 40 of the seal housing 24.

Providing a seal housing 24 may include forming a seal housing separate from a drive housing 14 of the juice extractor 10. Alternatively, providing a seal housing 24' may include integrally forming a seal housing in a drive housing 14' of a juice extractor 10' (FIG. 3).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A juice extractor comprising:
  a juice extraction area;
  a drive housing above said juice extraction area and at least one drive shaft extending downwardly from said drive housing to said juice extraction area; and
  at least one shaft seal carried by said drive housing and comprising
    a seal housing having a seal axis,
    at least one positioning ring contained within said seal housing and surrounding a corresponding drive shaft, and
    at least one sealing ring contained within said seal housing adjacent said at least one positioning ring and surrounding the corresponding drive shaft,
    said at least one positioning ring being radially spaced from the corresponding drive shaft when the corresponding drive shaft is aligned along the seal axis, and said at least one sealing ring sealingly engaging the corresponding drive shaft and being radially spaced from adjacent portions of said seal housing when the corresponding drive shaft is aligned along the seal axis to thereby accommodate transverse motion of the corresponding drive shaft.

2. The juice extractor according to claim 1 wherein said at least one positioning ring comprises a pair of longitudinally spaced apart positioning rings slidably and sealingly engaging opposite sides of said at least one sealing ring.

3. The juice extractor according to claim 1 wherein said at least one positioning ring engages radially adjacent portions of said seal housing.

4. The juice extractor according to claim 1 wherein said seal housing has an opening in a first end thereof defining a perimeter being radially spaced from the corresponding drive shaft when aligned along the seal axis.

5. The juice extractor according to claim 4 wherein said seal housing has a retaining ring groove adjacent a second end thereof opposite the first end; and wherein said at least one shaft seal further comprises a retaining ring removably positioned in the retaining ring groove.

6. The juice extractor according to claim 4 wherein said seal housing has a retaining ring groove adjacent a second end thereof opposite the first end; and wherein said at least one positioning ring is removably positioned in the retaining ring groove.

7. The juice extractor according to claim 1 wherein said at least one shaft seal is devoid of lubricants.

8. The juice extractor according to claim 1 wherein said at least one shaft seal further comprises at least one fastener securing said seal housing to adjacent portions of said drive housing.

9. The juice extractor according to claim 1 wherein said seal housing is integrally formed with adjacent portions of said drive housing.

10. The juice extractor according to claim 1 wherein said at least one sealing ring comprises a resin and TFE fluorocarbon fibers therein.

11. The juice extractor according to claim 1 wherein said at least one positioning ring comprises stainless steel.

12. A juice extractor comprising:
  a juice extraction area;
  a drive housing above said juice extraction area and at least one drive shaft extending downwardly from said drive housing to said juice extraction area; and
  at least one shaft seal carried by said drive housing and comprising
    a seal housing having a seal axis,
    a pair of positioning rings contained within said seal housing and surrounding a corresponding drive shaft, said positioning rings engaging radially adjacent portions of said seal housing, and
    at least one sealing ring contained within said seal housing, positioned between said positioning rings to be slidably and sealingly engaged thereby, and surrounding the corresponding drive shaft,
    said positioning rings being radially spaced from the corresponding drive shaft when the corresponding drive shaft is aligned along the seal axis, and said at least one sealing ring sealingly engaging the corresponding drive shaft and being radially spaced from adjacent portions of said seal housing when the corresponding drive shaft is aligned along the seal axis to thereby accommodate transverse motion of the corresponding drive shaft.

13. The juice extractor according to claim 12 wherein said seal housing has an opening in a first end thereof defining a perimeter being radially spaced from the corresponding drive shaft when aligned along the seal axis; wherein said seal housing has a retaining ring groove adjacent a second end thereof opposite the first end; and wherein said at least one shaft seal further comprises a retaining ring removably positioned in the retaining ring groove.

14. The juice extractor according to claim 12 wherein said at least one shaft seal is devoid of lubricants.

15. The juice extractor according to claim 12 wherein said at least one shaft seal further comprises at least one fastener securing said seal housing to adjacent portions of said drive housing.

16. The juice extractor according to claim 12 wherein said seal housing is integrally formed with adjacent portions of said drive housing.

17. The juice extractor according to claim 12 wherein said at least one sealing ring comprises a resin and TFE fluorocarbon fibers therein; and wherein said at least one positioning ring comprises stainless steel.

18. A method for making a shaft seal for a drive shaft extending downwardly from a drive housing to a juice extraction area of a juice extractor, the method comprising:

providing a seal housing having a seal axis;

disposing at least one positioning ring within the seal housing to surround the drive shaft and be radially spaced therefrom when the drive shaft is aligned along the seal axis; and disposing at least one sealing ring within the seal housing adjacent the at least one positioning ring and surrounding the corresponding drive shaft to sealingly engage the drive shaft and be radially spaced from adjacent portions of the seal housing when the drive shaft is aligned along the seal axis to thereby accommodate transverse motion of the corresponding drive shaft.

19. The method according to claim 18 wherein disposing the at least one positioning ring comprises disposing a pair of longitudinally spaced apart positioning rings slidably and sealingly engaging opposite sides of the at least one sealing ring.

20. The method according to claim 18 wherein disposing the at least one positioning ring comprises disposing the at least one positioning ring to engage radially adjacent portions of the seal housing.

21. The method according to claim 18 wherein the seal housing has an opening in a first end thereof defining a perimeter being radially spaced from the drive shaft when aligned along the seal axis, and a retaining ring groove adjacent a second end thereof opposite the first end; and further comprising disposing a retaining ring in the retaining ring groove.

22. The method according to claim 18 wherein the seal housing has an opening in a first end thereof defining a perimeter being radially spaced from the drive shaft when aligned along the seal axis, and a retaining ring groove adjacent a second end thereof opposite the first end; and wherein disposing the at least one positioning ring comprises disposing the at least one positioning ring in the retaining ring groove.

23. The method according to claim 18 wherein providing the seal housing comprises forming a seal housing separate from a drive housing of the juice extractor.

24. The method according to claim 18 wherein providing the seal housing comprises integrally forming the seal housing in a drive housing of the juice extractor.

25. The method according to claim 18 wherein the at least one sealing ring comprises a resin and TFE fluorocarbon fibers therein.

* * * * *